United States Patent [19]

Kühbauch

[11] Patent Number: 5,070,572
[45] Date of Patent: Dec. 10, 1991

[54] WIPING DEVICE FOR WINDOWS OF POWER VEHICLES

[75] Inventor: Gerd Kühbauch, Bühlertal, Fed. Rep. of Germany

[73] Assignee: Robert Bosch GmbH, Stuttgart, Fed. Rep. of Germany

[21] Appl. No.: 264,328

[22] Filed: Oct. 28, 1988

[30] Foreign Application Priority Data

Nov. 12, 1987 [DE] Fed. Rep. of Germany ....... 3738434

[51] Int. Cl.$^5$ .............................. B60S 1/06; B60S 1/28
[52] U.S. Cl. .................................. 15/250.13; 15/250.3
[58] Field of Search ........... 15/250.13, 250.34, 250.30, 15/250.33

[56] References Cited

U.S. PATENT DOCUMENTS

| | | | |
|---|---|---|---|
| 2,566,843 | 9/1951 | Lappin et al. | 15/250.13 X |
| 3,495,290 | 2/1970 | Deibel | 15/250.13 |
| 3,656,208 | 4/1972 | Kato et al. | 15/250.34 X |
| 4,264,997 | 5/1981 | Kolb et al. | 15/250.34 X |
| 4,672,709 | 6/1987 | Licata et al. | 15/250.34 X |

FOREIGN PATENT DOCUMENTS

| | | | |
|---|---|---|---|
| 1906440 | 8/1970 | Fed. Rep. of Germany ... | 15/250.13 |
| 2630067 | 1/1978 | Fed. Rep. of Germany . | |
| 2647510 | 4/1978 | Fed. Rep. of Germany ... | 15/250.13 |

Primary Examiner—Harvey C. Hornsby
Assistant Examiner—Scott J. Haugland
Attorney, Agent, or Firm—Michael J. Striker

[57] ABSTRACT

A wiping device for windows of power vehicles comprises a wiping member, a drive providing a rotary movement, a swinging transmission connected with the drive and having link parts including one link part which has a drive shaft carrying the wiping member, and a hinge which connects the link parts with one another, the hing having a hinge pin which is mouned on one of the link parts, while another of the link parts has a pin bearing in which the hinge pin is supported, and a unit for adjusting an effective link length and including a guiding path which extends eccentrically to an axis of the pin bearing and at least partially surrounds the latter, and a counter guide provided on the other link part which carries the pin bearing, the path being formed as a portion of an Archimedes spiral.

9 Claims, 2 Drawing Sheets

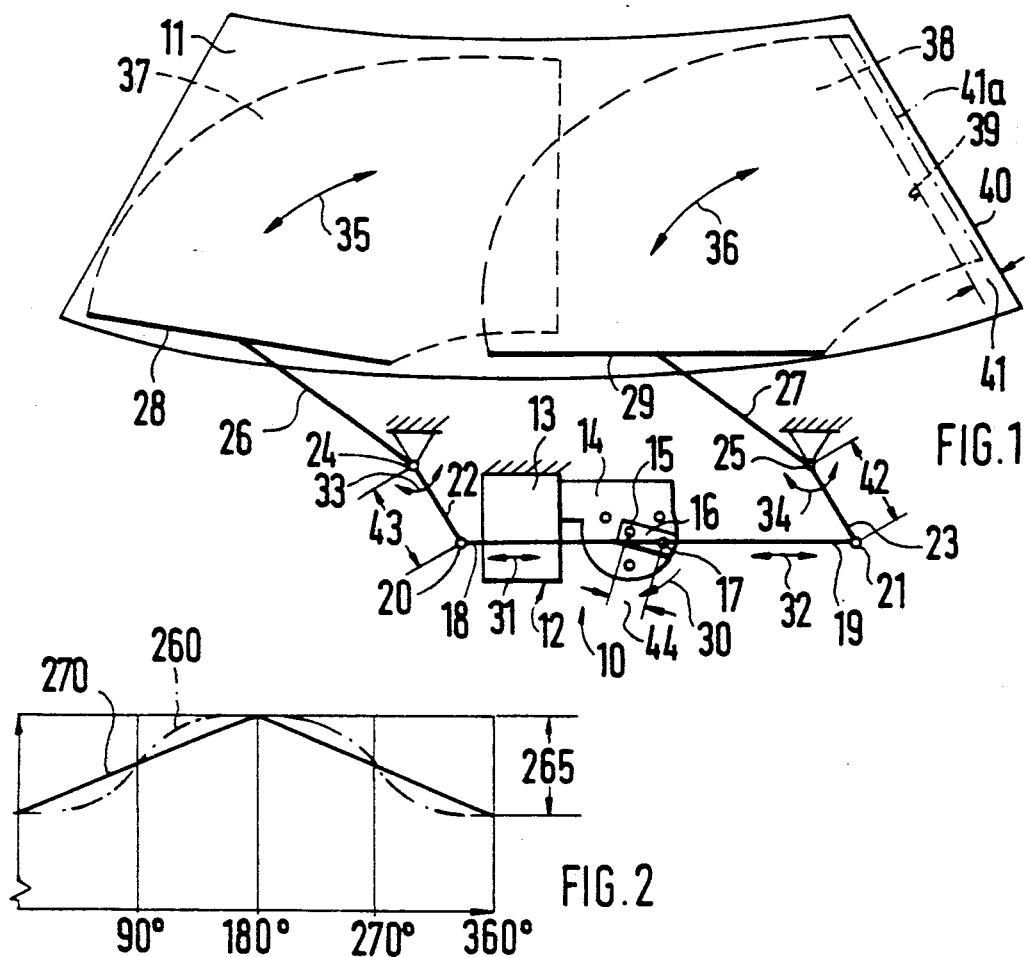
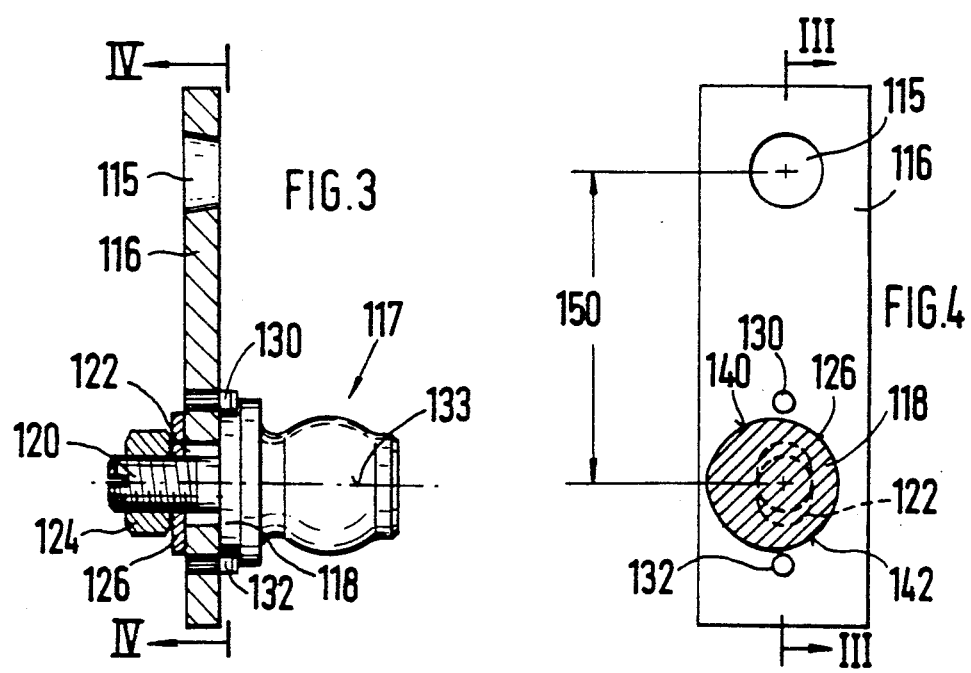

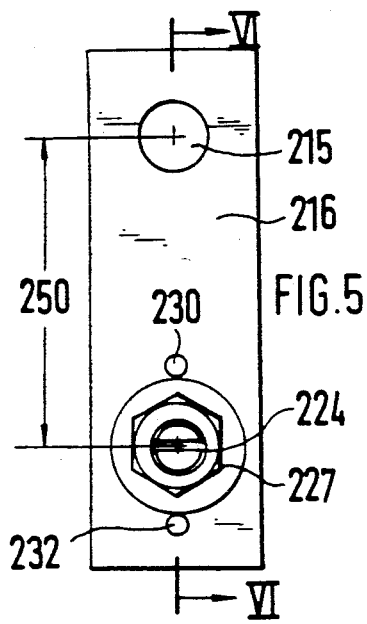
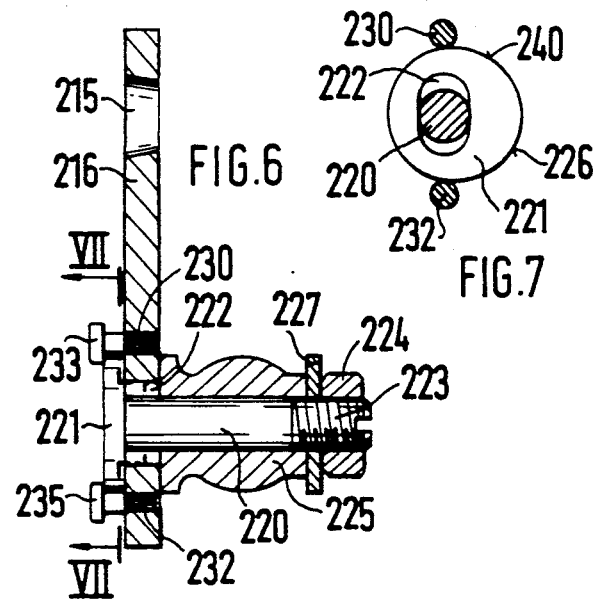
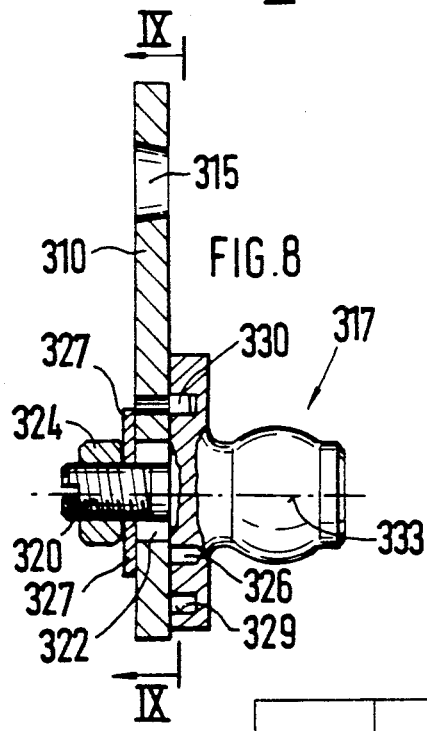
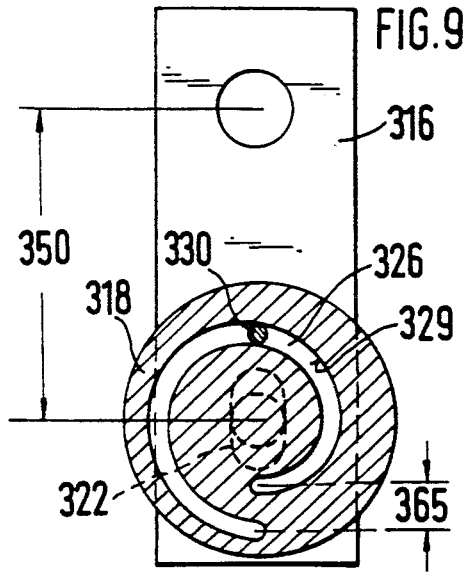
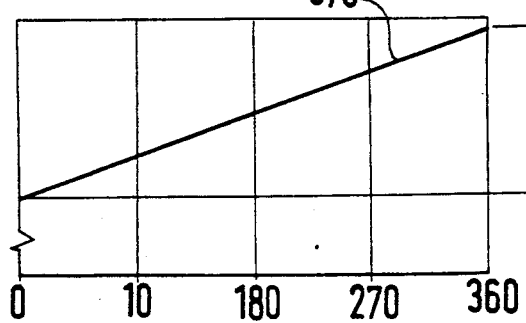

WIPING DEVICE FOR WINDOWS OF POWER VEHICLES

BACKGROUND OF THE INVENTION

The present invention relates to a wiping device for windows of power vehicles. More particularly, it relates to such a wiping device which has a drive with rotating drive movement and a swinging transmission which is formed as a linkage transmission and has a drive shaft which forms a wiper shaft and carries a wiper element.

Wiping devices of the above mentioned general type are known in the art. One of such wiping devices is disclosed for example in the German Patent No. 2,630,067. In this wiping device, the links of the linkage transmission are connected with one another by a hinge which has a pin mounted in one part of the swinging transmission and supported in a pin bearing of another part, and for adjusting the effective length of the swinging transmission the hinge pin is provided with a guiding path which cooperates with a counter guide on the part which carries the bearing pin. In the wiping device disclosed in this reference the guiding path is circular. It is also arranged eccentrically relative to the bearing axis. Depending on the adjustment of the counter guide relative to the guiding path, a rotation of the bearing pin over a predetermined angle can provide a differently great adjustment path of the bearing pin and thereby a not foreseeable change in the effective length of the linkage part. Thereby the mounting of the wiping device is considerably difficult since by the change of the effective length of the linkage part the wiping field which is covered by the wiping blade must be adapted to the edge of the window pane, which for example because of added manufacturing tolerances, is not in the predetermined position.

SUMMARY OF THE INVENTION

Accordingly, it is an object of the present invention to provide a wiping device of the above mentioned general type, which avoids the disadvantages of the prior art.

More particularly, it is an object of the present invention to provide a wiping device of the above mentioned type which has the advantage that a rotation of the hinge pin by a predetermined angle is associated over the whole adjustment path of the hinge pin with an exactly predetermined always identical change in the effective length of the linkage part, so that the respective position of the guiding path relative to the counter guide is insignificant.

In keeping with these objects and with others which will become apparent hereinafter, one feature of the present invention resides, briefly stated, in that the guiding path is formed as a portion of an Archimedes spiral.

When the wiping device is designed in accordance with the present invention it achieves the above specified objects.

In accordance with another feature of the present invention, the guiding path is formed on a surface of a projection which is arranged on the hinge pin.

The hinge pin can have a bearing part and a threaded pin which extends through an elongated hole extending at least approximately in its longitudinal direction.

The guiding path can be arranged on a head of a mounting screw for the bearing part, which extends through the link part.

The mounting screw can extend through the bearing part at the side of the bearing part which faces away of the link part and projects outwardly beyond the bearing part.

The mounting screw can extend through the link part in an elongated hole which extends approximately in its longitudinal direction.

The guiding path can be associated with two opposite guide shoulders which are fixed with the link part and which are arranged approximately on an elongation of a longitudinal axis of the elongated hole at both sides of the elongated hole.

The counterguide shoulders can be formed by a guide pin which is connected fixedly with the link part.

The guide pin can be provided at its end which faces away of the link part, with shoulders which overlap a region of the head of the mounting screw.

The guide path can be formed as a side wall of a groove in the hinge pin, in which a projection connected with the link part engages.

The hinge pin can extend through the link part with a threaded pin in an elongated hole which extends at least approximately in the longitudinal direction of the link part.

The projection of the link part can be arranged on an extension of the elongated hole longitudinal axis.

The projection can be formed by a guiding pin which is fixedly connected with the link part.

The guiding path can be formed as a groove in the link part in which the bearing pin engages with a projection.

The link part can be formed as a crank which is arranged on the drive shaft of the drive aggregate.

The link part can be formed as a displacement rod which belongs to the swinging transmission.

The link part can also be formed as a swinging rocker which is connected with the wiper shaft.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view schematically showing a wiping device for a windshield of a power vehicle;

FIG. 2 is a principal diagram showing an adjustment path of a bearing pin in dependence upon a rotary angle in accordance with the prior art and also in accordance with a first embodiment of the invention;

FIG. 3 is a view showing a section along the line III—III in FIG. 4, through a crank which is a part of a swinging transmission;

FIG. 4 is a partial section through the crank of FIG. 3 along the line IV—IV;

FIG. 5 is a plan view of a crank in accordance with another embodiment of the present invention;

FIG. 6 is a view showing a section through the crank of FIG. 5 along the line VI—VI;

FIG. 7 is a partial section through the crank of FIG. 6, along the line VII—VII;

FIG. 8 is a partial section through a crank in accordance with still a further embodiment of the present invention;

FIG. 9 is a partial section through the crank of FIG. 8 along the line IX—IX; and FIG. 10 is a diagram which shows an adjustment path of a crank pin in dependence upon a rotary angle for the crank in accordance with FIGS. 8 and 9.

DESCRIPTION OF THE PREFERRED EMBODIMENTS

A wiping device is identified in FIG. 1 as a whole with reference numeral 10 and used for windshield 11 of a power vehicle. It has a drive 12 which includes an electric motor 13 and a reducing transmission 14. The drive 12 has a rotatable drive shaft 15, on which a crank 16 is mounted. The crank 16 is provided on its free end with a hinge pin 17 which is guided in a pin bearing of another part formed by two displacement rods 18 and 19. The same is true for all embodiments, in which the crank 116, 216, 316 has the hinge pin 117, 217, 317 guided in the pin bearing of the other part formed by the displacement rods. The opposite ends of the displacement rods 18 and 19 are pivotally connected with hinge pins 20 and 21 which are fixedly connected respectively with a rocker arm 22 or 23. The rocker arms 22 and 23 are fixedly connected at their ends which face away of the hinge pins 20 and 21, with respectively a wiper shaft 24 and 25. Each wiper shaft 24 and 25 carries further a wiper arm 26 and 27 respectively. The latter are provided at their free ends with a wiper blade 28 and 29, respectively. Both the drive 12 and also both wiper shafts 24 and 25 are arranged fixedly on the frame.

In operation of the wiping device, the crank 16 rotates in direction of the arrow 30. The displacement rods or link parts 18 and 19 are displaced in direction of the double arrows 31 and 32, whereby the rocker arms 22 and 23 are singingly moved in direction of the double arrows 33 and 34. Simultaneously, the wiping blades 28 and 29 are displaced in direction of the double arrows 35 and 36, so that each of both wiping blades 28 and 29 cover a wiping field 37 and 38 which is identified in broken lines on the windshield 11.

As can be seen from FIG. 1, the wiping field 38 of the wiping blade 29 is smaller than required, so that between the reverse position of the wiping blade 29 which is identified with reference numeral 39 and a windshield edge 40 which is adjacent to the reverse position 39 a non-wiped region 41 remains. For displacing the reverse position 39 to the line 41a which is identified with a dash-dot line, a distance 42 between the swinging axis of the rocker arm 23 and the hinge pin 21 is correspondingly reduced, whereby the swinging angle of the rocker arm 23 is increased. Thereby the wiping field 38 is correspondingly increased, so that the wiping field will correspond to the respective requirements. Since the parking position of the wiper 29 shown in FIG. 1 is correct, for providing a uniform displacement of both wiping blade reverse positions with the wiping field increase, the wiper arm 27 can be again adjusted with the aid of conventional spline connection between the wiper arm and the wiper shaft. This is true naturally also for the cases in which the wiper field first is too great. Thereby it is to be considered that the distance 42 must be correspondingly increased. If however both wiping fields 37 and 38 require an identical correction, such a correction can be achieved in a simple manner when a distance 44 between the axis of rotation of the crank 16 and the crank pivot pin 17 is correspondingly adjusted. In cases where the correction exceeds a predetermined value, both the distance 44 and also at least one of the distances 42 and 43 can be again adjusted.

The adjustment of the crank hinge pin 17 or the rocker arm link pins 20 and 21 is illustrated in the following three embodiments of the present invention.

In accordance with a first embodiment, a crank 116 has an opening 115 for receiving the drive shaft 15 of the drive 12. The crank 116 is provided with a hinge pin 117 at a distance from the receiving opening 115. The hinge pin 117 in this embodiment is formed as a spherical pin forming a bearing part. The spherical pin 117 has a cylindrical projection 118 and a threaded pin 120 adjacent to the latter. The hinge pin 117 extends with its threaded pin 120 through the crank 116 in a elongated hole 122 and projects outwardly beyond a side of the crank 116 which is opposite to the projection 118. The hinge pin 117 can be mounted there by means of a threaded nut 124 associated with a washer 126. The projection 118 of the hinge pin 117 abuts against the crank 116 at its side which is opposite to the threaded nut 124. The elongated hole 122 extends in the longitudinal direction of the crank 116, and this longitudinal direction is determined by a line which is directed toward the receiving opening 115. The projection 118 has an outer surface 126 which forms a guiding path associated with a counter guiding means which is fixedly connected with the crank 116. This counter-guiding means are formed, as shown in FIG. 3 by guiding pins 130 and 132 which are arranged on an extension of the longitudinal axis of the elongated hole, at both sides of the elongated hole 122.

A bearing axis 133 of the hinge pin 117 which is surrounded by the guiding path 126 forms also the axis of the threaded pin 120. The guiding path 126 is however arranged eccentrically relative to the bearing axis 133. This arrangement is especially clearly shown in FIG. 4. The guiding path 126 is formed by two partial paths 140 and 142, of which each partial path forms a portion of an Archimedes spiral. The arrangement of the partial paths 140 and 142 is selected so that the section of the projection 118 shown in FIG. 4 forms a so-called equal thickness element. Both guiding pins 130 and 132 are arranged so that the projection 118 can be rotated between both guiding pins in a substantially playless manner. A further guidance of the guide pin 117 or the projection 118 is insured in that the threaded pin 120 is guided in the elongated hole 122 transversely to its displacement direction also in a playless manner. Thereby a guidance of the hinge pin 117 is performed in two intersecting axes, wherein one axis is determined by both guiding pins 130 and 132, while the other axis is formed by the contact point of the threaded pin 120 in the elongated hole 122.

When the threaded nut 124 is released, the hinge pin 117 can be rotated about its bearing axis 132. Since the bearing pin is shown in FIGS. 3 and 4 in its central position, during a rotation of the hinge pin 117 in a clockwise direction (FIG. 4) the effective length 150 of the crank 116 is increased. A rotation of the hinge pin 117 in a counterclockwise direction causes a reduction of the effective length 150 of the crank 116. After reaching the desired effective crank length, it is fixed by tightening the threaded nut 124.

In deviation from the above described embodiment, a crank 216 in FIGS. 5-7 is associated with a hinge pin 217 composed of two parts. It has a mounting screw 220 which extends through the crank 216 in an elongated hole 222 and abuts with its head 221 at a side of the crank 216. The mounting screw 220 extends with its threaded portion 223 outwardly beyond the crank 216 and carries a bearing part 225 which is formed as a spherical sleeve. The spherical sleeve 225 can be clamped by means of a threaded nut 224 against the crank 216 with interposition of a washer 227, and thereby fixed. Further, the crank 216 has a receiving opening 215 for the drive shaft 15 of the drive aggregate 12. The mounting screw 220 which belongs to the hinge pin 217 has a guiding path 226 which is provided on an outer surface 240 of its head 221. This guiding path exactly corresponds to the guiding path shown in FIG. 4 and described in connection with this Figure. Also, the arrangement of the elongated hole 222 corresponds to the above described arrangement of the elongated hole 122 of the crank 116.

Two guiding pins 230 and 232 are associated with the guiding path 226 and serve as counter guide shoulders. They are fixedly connected with the crank 216. The guiding pins 230 and 232 are provided with heads 233 and 235 at their ends which face away of the crank 216. The guiding pins overlap with their heads 233 and 235 in the region of the head 221 of the mounting screw 220. Thereby the mounting screw 222 is non-releasably connected with the crank 216. The shoulders 233 or 235 of the guiding pins 230 and 232 provide for the mounting screw 220 or its head 221 so much play that it can be rotated without problems. In correspondence with the embodiments of FIGS. 2, 3 and 4, in the embodiment of FIGS. 5-7 the width of the elongated hole 122 is determined relative to the diameter of the mounting screw 220 so that it can be guided transversely to its displacement direction in a substantially playless manner between the side walls of the elongated hole 222. It is clear that after the release of the threaded nut 224, the mounting screw 220 can be turned so that in cooperation with the guiding path 240 with the guiding pins 230 and 232, the hinge pin 217 can be displaced in the above described manner, depending on whether the mounting screw 220 is rotated in a clockwise direction or in a counterclockwise direction. Also here a change of the effective length of the link part embodied in the crank 216 is thereby achieved. The effective length of the crank 216 is identified in FIG. 5 with reference numeral 250.

The advantages of the inventive wiping device as compared with the wiping device in accordance with the prior art can be seen from FIG. 2. In the known wiping device a sinus shaped adjusting curve 260 which is shown in FIG. 2 in dash-dot line is obtained. In the wiping device in accordance with the present invention an adjusting curve 270 is obtained. As can be seen from this drawing, the adjusting curve 270 is uniform over its entire length. An exactly determined adjustment path of the hinge pin is associated with a predetermined rotary angle of the guiding path. The maximum adjustment is identified with reference numeral 265. FIG. 2 further shows that this maximum adjustment path is achieved after a rotation of 180° of the guiding path 126 or 226.

In the embodiment shown in FIGS. 8 and 9, a link part 316 is also formed on a crank. The crank 316 has also a receiving opening 315 for the drive shaft 15 of the drive 12. In this embodiment a hinge pin 317 is formed similarly to the hinge pin 117. It extends with its threaded pin 320 through an elongated hole 322 of the crank 316. The hinge pin 317 is fixable and releasable relative to the crank 316 by means of a threaded nut 324 and an associated washer 327. The hinge pin 317 is provided with a flange-like projection 318 at its side which faces away of the threaded nut 324. The projection 318 is provided with a spiral shaped groove 326 at its side facing toward the crank 316. A pin-shaped projection 330 which acts as a counter guide shoulder and is connected with the crank 316 engages in the groove 326. The spiral shaped groove 326 corresponds to a portion of an Archimedes spiral which surrounds the bearing axis 333.

The hinge pin 313 similarly to the hinge pin 117 of FIGS. 3 and 4 is guided inside an elongated hole 322 with its threaded pin 320 in two points. A further two-point guidance is obtained in that the guiding pin 330 which is seated on an extension of the elongated hole axis and forms the counter guide shoulder is supported on both side walls of the groove 326. In this embodiment also the hinge pin 317 is located in its central position. By rotation of the hinge pin or the projection 318 connected therewith in a clockwise direction shown in FIG. 9, the effective length 350 of the crank 316 is increased. If the hinge pin 317 is rotated in a counterclockwise direction, a reduction of the effective length 350 of the crank 316 is obtained. Thereby the side walls 329 of the groove 326 form a guiding path which cooperates with the guiding pin 330.

The advantage of the embodiment shown in FIGS. 8 and 9 relative to the above described embodiments is that as can be clearly recognized from this embodiment, a unidirectional adjustment of the hinge pin 317 can be achieved by rotation of the hinge pin over 360°. Naturally, it is recommended to extend the spiral groove 326 further, so that an increased adjustment path is produced. This can be seen from FIG. 10 where the whole adjustment path identified with reference numeral 365 is produced by a straight line 370. It is further clear from this Figure that over the entire rotation of the pin a unidirectional pin adjustment is produced which is proportional to the pin rotation.

In all above described embodiments the guiding path 126, 226, 326 is formed as a part of an Archimedes spiral.

A further advantage of the present invention relative to the prior art is that the hinge pins 117, 217, 317 is adjusted to guide on a straight line, while the adjustment movement in the prior art is performed over a curve.

It will be understood that each of the elements described above, or two or more together, may also find a useful application in other types of constructions differing from the types described above.

While the invention has been illustrated and described as embodied in a wiping device for windows of power vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A wiping device for windows of power vehicles, comprising a wiping member; a drive providing a rotary movement; a swinging transmission connected with said drive and having link parts connected with said wiping member, and a hinge which connects said link parts with one another, said hinge having a hinge pin which is adjustably mounted on one of said link parts, while another of said link parts supports said hinge pin; and means for adjusting an effective length of said one link part and including a guiding surface on the hinge pin which extends eccentrically to an axis of said hinge pin and at least partially surrounds the latter, and a counter guide provided on the one link part and being guided by the guiding surface during adjustment of the hinge pin, said guiding surface being formed as a portion of an Archimedes spiral having at least one revolution.

2. A wiping device as defined in claim 1, wherein said hinge pin has a projection in which, said guiding surface is formed.

3. A wiping device as defined in claim 1, wherein said hinge pin has a bearing part and a threaded pin, said one link part having an elongated hole, and said threaded pin extending through said elongated hole approximately in a perpendicular direction of the latter.

4. A wiping device as defined in claim 1, wherein said drive has a drive shaft, said one link part being formed as a crank which is arranged on said drive shaft of said drive.

5. A wiping device as defined in claim 1, wherein said swinging transmission has a displacement rod, said other link part being formed as said displacement rod of said swinging transmission.

6. A wiping device for windows of power vehicles, comprising a wiping member; a drive providing a rotary movement; a swinging transmission connected with said drive and having link parts connected with said wiping member, and a hinge which connects said link parts with one another, said hinge having a hinge pin which is adjustably mounted on one of said link parts, while another of said link parts supports said hinge pin; and means for adjusting an effective length of said one link part and including a guiding surface on the hinge pin which extends eccentrically to an axis of said hinge pin and at least partially surrounds the latter, and a counter guide provided on the one link part and being guided by the guiding surface during adjustment of the hinge pin, said guiding surface being formed as a portion of an Archimedes spiral having at least one revolution, said hinge pin having a groove provided with a side wall which forms said guiding surface, said one link part having a projection forming said counter guide and extending through said groove.

7. A wiping device as defined in claim 6, wherein said one link part has an elongated hole extending at least in a longitudinal direction of said one link part, said hinge pin being provided with a threaded pin which extends through said elongated hole of said other link part.

8. A wiping device as defined in claim 7, wherein said projection of said one link part is arranged on an extension of a longitudinal axis of said elongated hole.

9. A wiping device as defined in claim 6, wherein said projection is formed as a guiding pin which is fixedly connected with said one link part.

* * * * *